United States Patent [19]
Tabata et al.

[11] Patent Number: 5,757,544
[45] Date of Patent: May 26, 1998

[54] IMAGE DISPLAY APPARATUS

[75] Inventors: Seiichiro Tabata, Hino; Yoichi Iba, Hachioji; Satoshi Imai, Hannou; Takayoshi Togino, Koganei, all of Japan

[73] Assignee: Olympus Optical Co., Ltd., Tokyo, Japan

[21] Appl. No.: 207,422

[22] Filed: Mar. 8, 1994

[30] Foreign Application Priority Data

| Mar. 9, 1993 | [JP] | Japan | 5-048150 |
| Mar. 10, 1993 | [JP] | Japan | 5-049454 |
| Dec. 21, 1993 | [JP] | Japan | 5-322123 |
| Dec. 27, 1993 | [JP] | Japan | 5-330379 |

[51] Int. Cl.$^6$ .................. G02B 27/02; G02B 21/06; G02B 27/46; G02B 21/56
[52] U.S. Cl. .................. 359/434; 359/385; 359/599; 359/451; 359/707; 359/666; 359/670; 359/672
[58] Field of Search .................. 359/434, 385, 359/389, 599, 600, 433, 629, 561, 451, 707, 666, 670, 672

[56] References Cited

U.S. PATENT DOCUMENTS

| 3,988,066 | 10/1976 | Suzuki et al. | 355/78 |
| 4,026,641 | 5/1977 | Bosserman et al. | 359/869 |
| 4,053,208 | 10/1977 | Kato et al. | 359/460 |
| 4,111,561 | 9/1978 | Plummer | 359/707 |
| 4,372,639 | 2/1983 | Johnson | 359/15 |
| 4,637,691 | 1/1987 | Uehara et al. | 359/385 |
| 4,826,292 | 5/1989 | Spohr | 359/741 |
| 4,897,537 | 1/1990 | Miyamoto et al. | 359/389 |
| 4,911,532 | 3/1990 | Hidaka | 359/629 |
| 4,961,626 | 10/1990 | Fournier, Jr. et al. | 359/630 |
| 5,016,950 | 5/1991 | Smith | 359/15 |
| 5,046,827 | 9/1991 | Frost et al. | 359/559 |
| 5,099,354 | 3/1992 | Lichtman et al. | 359/385 |
| 5,123,726 | 6/1992 | Webster | 351/201 |
| 5,164,848 | 11/1992 | Firth et al. | 359/13 |
| 5,383,056 | 1/1995 | Nishii et al. | 359/561 |

*Primary Examiner*—Paul M. Dzierzynski
*Assistant Examiner*—Mohammad Y. Sikder
*Attorney, Agent, or Firm*—Cushman Darby & Cushman IP Group of Pillsbury Madison & Sutro LLP

[57] ABSTRACT

A head-mounted image display apparatus having an exit pupil that is enlarged without causing an increase in the size of a relay optical system or a reduction in the size of a projected image. The head-mounted image display apparatus has an image display device (1) having a display surface for displaying an image, a relay optical system (2) for transmitting the image displayed on the display surface of the image display device (1) to form an image of the display surface, and an ocular optical system (4) for projecting the image transmitted by the relay optical system inside an observer's eyeball as an enlarged image. A numerical aperture (NA) enlarging element is disposed at a position conjugated with the display surface with respect to the relay optical system (2). Thus, pupil alignment is facilitated without causing an increase in the size of the relay optical system (2) or a reduction in the size of the projected image. Also, provided as a technique whereby field curvature of the ocular optical system is corrected to provide a flat image for observation.

14 Claims, 16 Drawing Sheets

(a)

(b)

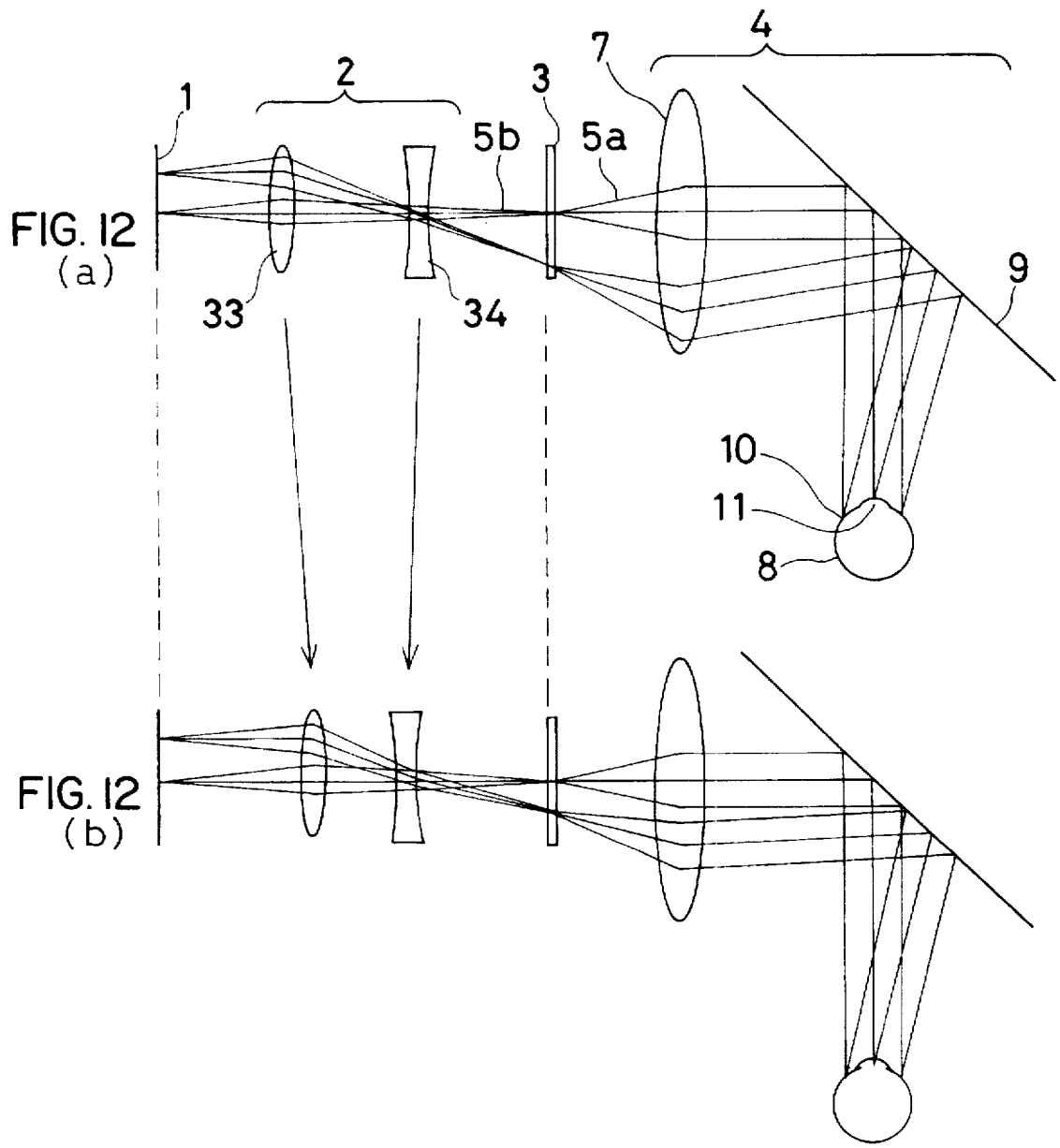

FIG. 21
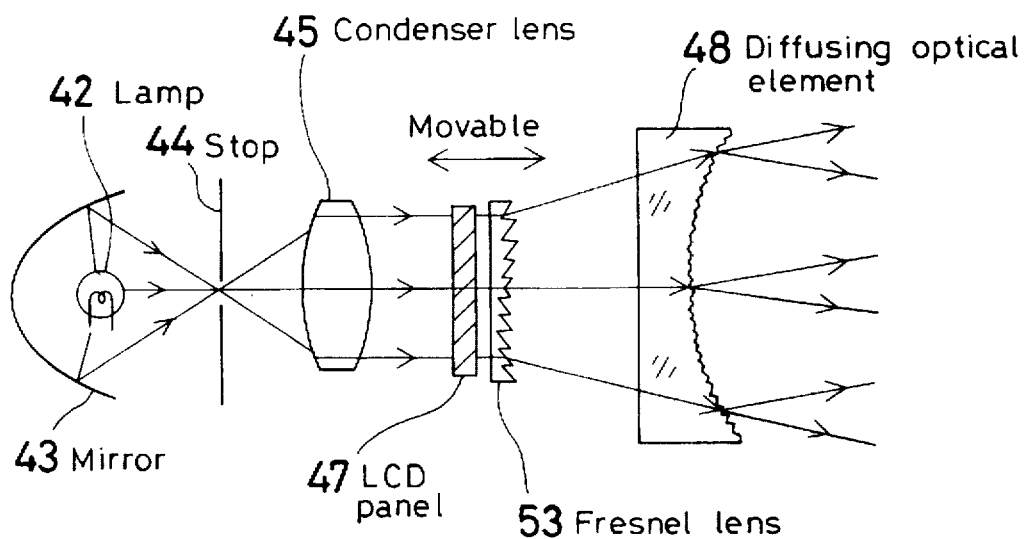
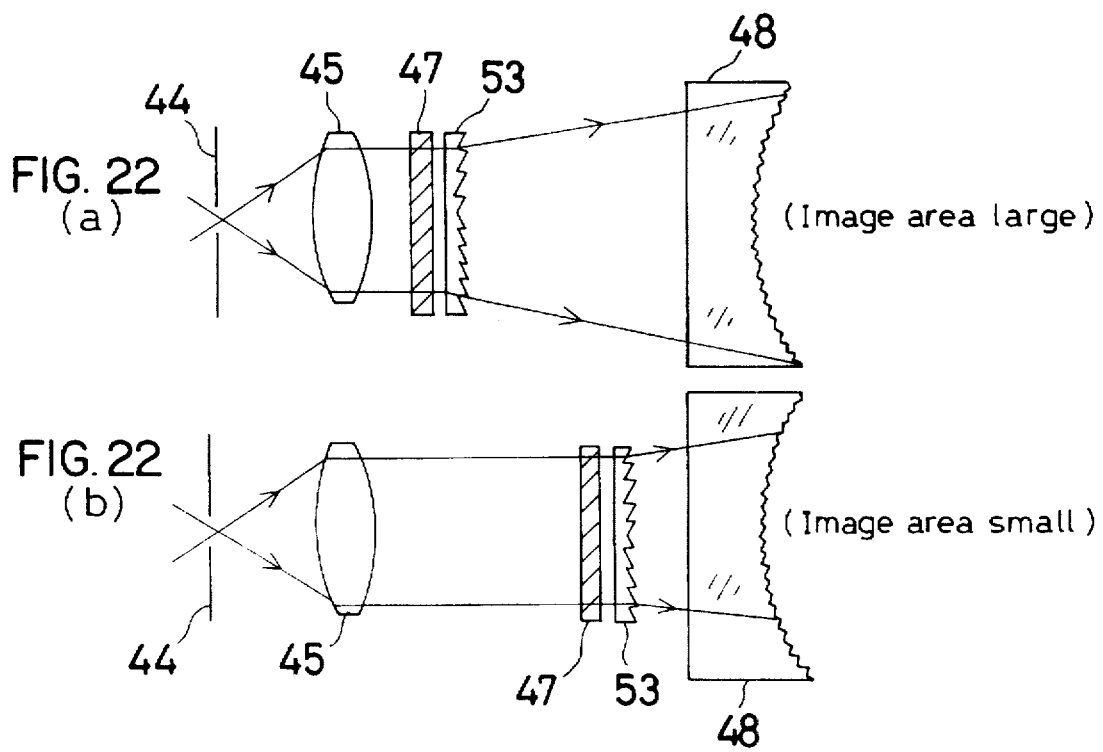

LCD panel

Eye

IMAGE DISPLAY APPARATUS

BACKGROUND OF THE INVENTION

The present invention relates to an image display apparatus wherein an image displayed on the screen of a VTR, TV, computer, etc. is projected as an enlarged image onto an observation position (eye point) of an observer. More particularly, the present invention relates to an image display apparatus of the type described above which is mounted on the observer's head or face in actual use.

One type of image display apparatus which is mounted on the observer's head in use and hence known as "head-mounted image display apparatus" has heretofore been devised for the purpose of enabling the user to enjoy a wide-screen image by oneself without leaking image information to the surroundings or of allowing the user to view an image outdoors.

FIG. 24 is a fragmentary sectional view of one example of conventional head-mounted image display apparatuses which is shown in Japanese Patent Application Laid-Open (KOKAI) No. 3-39925 (1991). The illustrated head-mounted image display apparatus 101 has an image display device 102 incorporated in the apparatus mounted on the observer's head. The image display device 102 is connected to an image signal supply unit (not shown) through an image signal supply cord 103.

On the display surface side of the image display device 102, a relay optical system 104 is disposed for transmitting an image displayed on the image display device 102. The relay optical system 104 forms an image on a surface 105 which is conjugated with the display surface of the image display device 102. The image that is transmitted by the relay optical system 104 is projected inside an observer's eyeball 107 as an enlarged image by an ocular optical system 106. At this time, to enable the projected image to be seen at a distant place for the observer, a bundle of rays 108 from each pixel on the display surface is converted into approximately parallel rays 109, by the ocular optical system 106 to form an exit pupil 110, which is then made incident on an observer's pupil 111.

However, when the beam diameter of the parallel rays 109 formed by the ocular optical system 106 is small, the diameter of the exit pupil 110 is also limited to a correspondingly small value. To obtain a favorable projected image, the observer's pupil 111 must receive the parallel rays 109 over the whole area thereof. Therefore, when the diameter of the exit pupil 110 is small, the observer's pupil 111 may move outside the exit pupil 110 when the observer views an image at an edge of the visual field because the rolling center of the observer's eyeball 107 lies in the vicinity of the center of the eyeball 107. In such a case, the observer cannot view the projected image.

If it is intended to increase the beam diameter of the parallel rays 109 in order to enlarge the diameter of the exit pupil 110, it becomes necessary to increase the numerical aperture (hereinafter referred to as "NA") in front of and behind the conjugate surface 105 formed by the relay optical system 104. For this purpose, however, the lens diameter of the relay optical system 104 must be increased, which invites an increase in the overall size of the apparatus. Since the head-mounted image display apparatus is mounted on the observer's head, the increase in the size of the apparatus leads to an increase in the load imposed on the observer, as a matter of course. In addition, the increase in the lens diameter of the relay optical system 104 causes an increase in the height, angle, etc. of rays incident on each surface of the relay optical system 104. Accordingly, it becomes likely that aberration will be produced, and thus the aberration performance of the image viewed by the observer will be degraded.

The diameter of the exit pupil 110 may be enlarged by lengthening the focal length of the ocular optical system 106. In such a case, however, the visual angle decreases, so that the image obtained decreases in size and hence becomes difficult to see, causing the observer's eye to become fatigued.

If the exit-side NA is enlarged by shortening the focal length of the relay optical system 104, the image formed on the conjugate surface 105 decreases in size. Consequently, the visual angle for the projected image also decreases, giving rise to problems similar to the above.

In general, when parallel rays are formed by an optical system using a lens and a reflecting curved surface, the product of the beam diameter and the visual angle is constant from the paraxial point of view; therefore, if the exit pupil 110 enlarges, the visual angle inevitably decreases and the image obtained decreases in size unless the entrance-side NA of the relay optical system is enlarged.

However, when the entrance-side NA of the relay optical system 104 is enlarged, the lens diameter increases, as described above. Further, the number of lenses required for aberration correction increases, resulting in an increase in the size of the relay optical system 104.

Incidentally, a magnifier-type ocular optical system (see SPIE Vol. 1457 (1991), pp. 140–158), generally known as Eye Phone", such as that shown in the sectional view (a) of FIG. 25 may be employed in the above-described type of head-mounted image display apparatus. With such an ocular optical system, however, large field curvature is produced, as will be clear from the graph (b) in FIG. 25, which shows field curvature revealed by backward tracing of rays. Accordingly, the image for observation obtained with the ocular optical system is curved and likely to be out of focus at the edges thereof. U.S. Pat. No. 5,123,726 discloses a technique whereby an image surface is formed at a position close to an observer's eye by using an optical fiber bundle. The disclosed technique suffers, however, from the disadvantage that the observer must use a contact lens to view an image displayed. Further, the apparatus increases in size, disadvantageously.

As described above, an ocular optical system that is employed in a head-mounted image display apparatus generally involves field curvature. Therefore, it is not easy to obtain an observation image of high resolution which is sharp over the entire field angle.

SUMMARY OF THE INVENTION

In view of the above-described problems of the background art, it is a first object of the present invention to provide a head-mounted image display apparatus which is designed so that the exit pupil is enlarged by enlarging the numerical aperture without causing an increase in the size of the relay optical system or a reduction in the size of the projected image.

It is a second object of the present invention to provide a head-mounted image display apparatus which enables observation of an image of high resolution which is sharp over the entire field angle even if the ocular optical system involves field curvature.

According to one aspect of the present invention, there is provided an image display apparatus including an image display device having a display surface for displaying an image, a relay optical system for transmitting the image displayed on the display surface of the image display device to form an image of the display surface, an ocular optical system for projecting the image transmitted by the relay optical system inside an observer's eyeball as an enlarged image, and a numerical aperture enlarging element disposed at or near a position where the image of the display surface is formed by the relay optical system.

In addition, the present invention provides an image display apparatus including an image display device having a display surface for displaying an image, a relay optical system for transmitting the image displayed on the display surface of the image display device to form an image of the display surface, an ocular optical system having a reflecting device for bending an optical path formed by a bundle of rays passing through the relay optical system to project the image transmitted by the relay optical system inside an observer's eyeball as an enlarged image, and a numerical aperture enlarging element disposed at or near a position where the image of the display surface is formed by the relay optical system, wherein the reflecting device forms an optical path between the observer's eyeball position and the image display device by reflection and also forms an optical path between the observer's eyeball position and an outside world image by transmission.

In addition, the present invention provides an image display apparatus having: a face-mounted unit which includes an image display device having a display surface for displaying an image, a relay optical system for transmitting the image displayed on the display surface of the image display device to form an image of the display surface, an ocular optical system for projecting the image transmitted by the relay optical system inside an observer's eyeball as an enlarged image, and a numerical aperture enlarging element disposed at or near a position where the image of the display surface is formed by the relay optical system; and a support member for retaining the face-mounted unit.

In the above-described image display apparatuses according to the first aspect of the present invention, the relay optical system may have a plurality of lenses so that the magnification is changed from a low magnification to a high magnification by varying the spacing between the lenses.

The above image display apparatuses may further include an aspect ratio changing member provided on an optical path formed by a bundle of rays emitted from the image display device to change the ratio of width to height of the image transmitted.

In this case, the aspect ratio changing member is preferably provided between the image display device and the position where the image of the display surface is formed. The aspect ratio changing member may include a lens having a toric surface. Alternatively, the aspect ratio changing member may have a lens system including a combination of a convex cylindrical lens and a concave cylindrical lens.

The numerical aperture enlarging element may be a beam diffusing member, which may be a diffusing plate, e.g., a plane diffusing plate, a curved diffusing plate, a transmissive diffusing plate, a reflective diffusing plate, etc.

The numerical aperture enlarging element may also be a member having periodically arranged structural portions, such as a diffraction grating, e.g., a Fresnel zone plate, a toroidal grating, a plane diffraction grating, a concave diffraction grating, etc.

A lenticular sheet may also be used to form the numerical aperture enlarging element.

According to another aspect of the present invention, there is provided an image display apparatus including an illuminating light source, a transmissive image display device for displaying an image by transmitting light from the illuminating light source, an ocular optical system for projecting the image formed by the transmissive image display device inside an observer's eyeball as an enlarged image, and a diffusing optical element disposed between the transmissive image display device and the ocular optical system and having a diffusing surface which is curved so as to correct field curvature involved in the ocular optical system.

In this case, the diffusing surface may be provided on an entrance surface of the diffusing optical element that is the closest to the image display device. Alternatively, the diffusing surface may be provided on an exit surface of the diffusing optical element that is the closest to the ocular optical system.

In addition, the present invention provides an image display apparatus including an illuminating light source, a transmissive image display device for displaying an image by transmitting light from the illuminating light source, an ocular optical system for projecting the image formed by the transmissive image display device inside an observer's eyeball as an enlarged image, and an optical fiber bundle disposed between the transmissive image display device and the ocular optical system and having an exit surface which is curved so as to correct field curvature involved in the ocular optical system.

In these image display apparatuses according to the second aspect of the present invention, the illuminating light source is preferably arranged in the form of a point source. For this purpose, the illuminating light source may have a lamp, a concave mirror, and a stop with a point aperture, for example. In this arrangement, the concave mirror may be formed so that rays of light emitted from the lamp are substantially focused onto the aperture position of the stop.

The arrangement may also be such that an optical element having power is disposed between the illuminating light source and the diffusing optical element, and that the transmissive image display device and the diffusing optical element are arranged to be movable.

As the diffusing optical element, a member having periodically arranged structural portions may be employed.

According to the first aspect of the present invention, an NA (Numerical Aperture) enlarging element is disposed at or near a position which is conjugated with the display surface with respect to the relay optical system, so that the NA enlarging element enlarges the NA of a bundle of rays incident thereon and sends the rays to the ocular optical system. The bundle of rays having the NA enlarged by the NA enlarging element is converted into approximately parallel rays to form an exit pupil. The exit pupil has an increased diameter because the NA has been enlarged. Accordingly, it is possible to increase the degree of freedom with which the observer can position his/her pupil to view the displayed image.

The relay optical system is preferably arranged in the form of a variable-magnification optical system whereby the magnification of an image for observation can be changed stepwisely as desired or continuously from a low magnification to a high magnification, thus enabling an increase in the degree of freedom with which the observer can enjoy the displayed image.

The above-described image display apparatus may be provided therein with an aspect ratio changing member such as that used to change over ordinary photography mode and panoramic photography mode from one to the other. By adding such an arrangement, it becomes possible to change over a television image generally having an aspect ratio of 4:3 and a high-definition television image generally having an aspect ratio of 16:9 and to enjoy both images without weakening the power of the displayed image or the feeling of being at the actual spot which is given to the observer when viewing the displayed image.

The aspect ratio changing member is preferably provided in the image display apparatus between the image display device and a conjugate surface formed by the relay optical system from the viewpoint of the design freedom and with a view to realizing a compact structure.

As a specific arrangement of the aspect ratio changing member, it is preferable to use a lens having a toric surface or a lens system having a combination of a cylindrical convex lens and a cylindrical concave lens.

As a specific example of the NA enlarging element, it is preferable to use a beam diffusing member which enlarges the exit-side NA by diffusing a bundle of incident rays. As a specific arrangement of the beam diffusing member, it is preferable to use a diffusing plate, e.g., a plane diffusing plate, a curved diffusing plate, etc. The diffusing plate may be of either the transmissive or reflective type.

As the NA enlarging element, a member having periodic structural portions may be used in place of the beam diffusing member. The member having periodic structural portions is preferably a diffraction grating having grooves or print patterns which are periodically provided. As a specific arrangement of the diffraction grating, it is preferable to use a Fresnel zone plate, a toroidal grating, a plane diffraction grating, a concave diffraction grating, etc. The diffraction grating may be of either the transmissive or reflective type.

The NA enlarging element may be a lenticular sheet.

In the image display apparatuses according to the second aspect of the present invention, either a diffusing optical element or an optical fiber bundle which has an entrance or exit surface formed as a diffusing surface is disposed between the transmissive display device and the ocular optical system. The diffusing surface of the diffusing optical element or the exit surface of the optical fiber bundle has a configuration which fits field curvature produced by the ocular optical system. Accordingly, an image displayed on the transmissive image display device is converted by the diffusing optical element or the optical fiber bundle into a secondary display image formed on the diffusing surface or the exit surface adapted for compensating for the field curvature of the ocular optical system. Thus, even if the ocular optical system, which enlarges the secondary display image for observation, involves field curvature, it is possible to observe an image of high resolution which is sharp over the entire field angle.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 12(a) and FIG. 12(b) show an optical system of a fifth embodiment according to the first aspect of the present invention.

FIG. 21 is a sectional view showing an optical system of an essential part of a fourth embodiment according to the second aspect of the present invention.

FIG. 22(a) and FIG. 22(b) illustrate a function of the fourth embodiment according to the second aspect of the present invention.

DESCRIPTION OF THE PREFERRED EMBODIMENTS

The image display apparatus of the present invention will be described below in detail by way of some embodiments according to the first and second aspects of the present invention.

Figure 1:
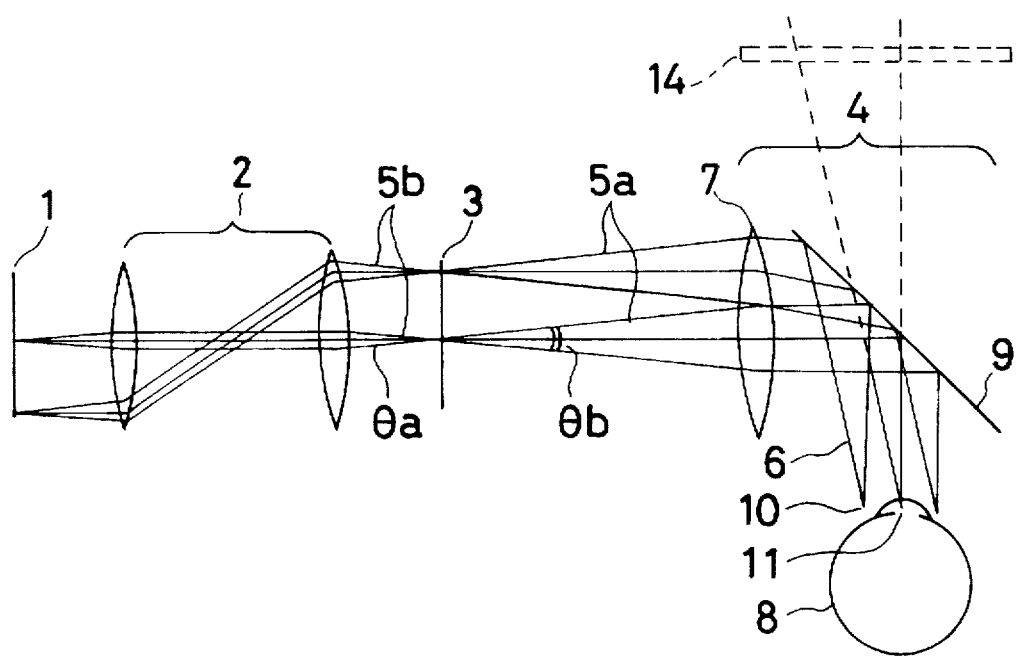
FIG. 1 is a schematic view showing an optical system of a first embodiment of an image display apparatus according to a first aspect of the present invention.

First of all, a first embodiment of the image display apparatus according the first aspect of the present invention will be explained below with reference to FIG. 1. FIG. 1 is a schematic view showing optical elements disposed in an optical path in a simplified manner for the sake of simplicity of illustration.

In this embodiment, a back-light type liquid crystal display device (hereinafter referred to as "LCD") 1 is used as an image display device. A relay lens system 2 is disposed on the display surface side of the LCD 1. A plane diffusing plate 3 is provided as a diffusing plate at a position which is conjugated with the display surface with respect to the relay lens system 2. Further, an ocular optical system 4 is disposed in the direction of the optical axis. The ocular optical system 4 is composed of a magnifying lens group 7 disposed at a position where a bundle or rays 5a from each point of an image formed at the position conjugated with the display surface is converted into parallel rays 6, and a mirror 9 for bending the optical axis to project an image on an observer's eyeball 8.

A bundle of rays 5b from an image displayed on the display surface of the LCD 1 is transmitted by the relay lens system 2 to form an image on a surface conjugated with the display surface. The plane diffusing plate 3, which is disposed on the conjugate surface, enlarges the numerical aperture (NA) of the rays 5b incident thereon. The plane diffusing plate 3 satisfies the following condition:

θa<θb where θa is the angle of incidence of the axial ray on the plane diffusing plate 3, and θb is the emergent angle of the axial ray.

The rays 5a emerging from the plane diffusing plate 3 enter the magnifying lens group 7 of the ocular optical system 4. The rays 5a are converted into parallel rays 6 through the magnifying lens group 7 and reflected by the mirror 9 to form an exit pupil 10.

The observer can obtain a good projected image by placing the pupil 11 of his/her eyeball 8 in an area where the parallel rays 6 intersect each other at the position of the exit pupil 10 and in front of and behind the exit pupil position.

Since the NA is enlarged by the action of the plane diffusing plate 3, the diameter of the exit pupil 10 correspondingly increases. Therefore, the observer can readily find a position where his/her pupil 11 is to be placed. In addition, the displayed image can be transmitted without causing an increase in the size of the relay lens system 2 or a reduction in the size of the projected image.

Next, a second embodiment according to the first aspect of the present invention will be explained with reference to FIG. 2.

The same constituent elements as those in the first embodiment are denoted by the same reference numerals, and description thereof is omitted.

Figure 2:
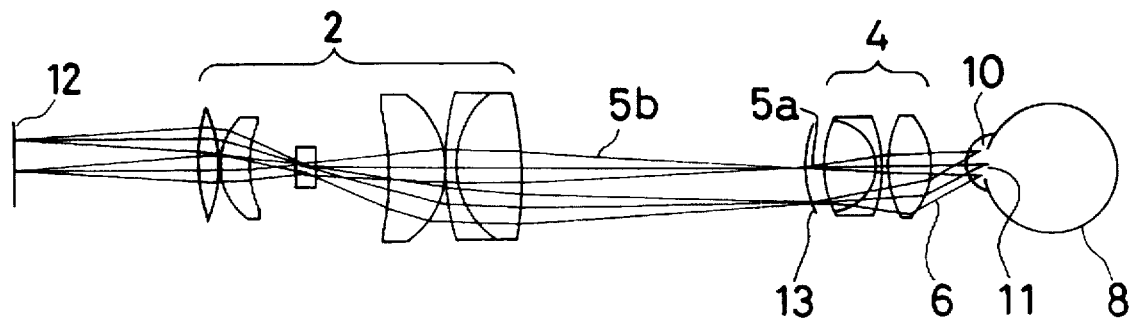
FIG. 2(a) and FIG. 2(b) show an optical system of a second embodiment according to the first aspect of the present invention.
Figure 2:
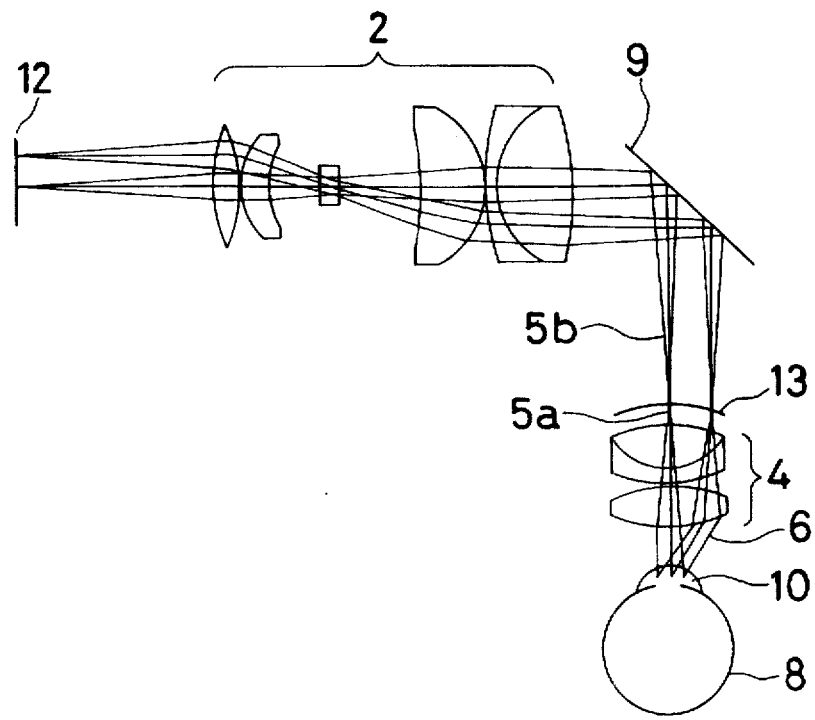

Referring to (a) in FIG. 2, the second embodiment uses a plasma display 12 as an image display device and further uses a curved diffusing plate 13 having a concave surface directed toward the observer's eyeball 8 in place of the diffusing plate 3. The curved diffusing plate 13 is superimposed on a conjugate surface formed by the relay lens system 2, which has previously been designed so that a surface conjugated with the display surface is curved, so as to correct field curvature produced in the ocular optical system 4.

The rest of the arrangement is similar to that of the first embodiment. That is, an image that is displayed on the display surface of the plasma display 12 is formed on the surface conjugated with the display surface by the relay lens system 2. The curved diffusing plate 13, which is disposed on the conjugate surface, enlarges the NA of the bundle of rays 5b incident thereon. Let us show only the result, omitting detailed numerical data. The curved diffusing plate 13 in this embodiment converts the NA of the bundle of incident rays 5b, which is 0.07, into 0.17. The rays 5a emerging from the curved diffusing plate 13 are converted into parallel rays 6 by the ocular optical system 4 to form an exit pupil 10.

With the above-described arrangement, the observer can obtain a good projected image by placing the pupil 11 of his/her eyeball 8 in an area where the parallel rays 6 intersect each other at the position of the enlarged exit pupil 10 and in front of and behind the exit pupil position in the same way as in the first embodiment.

Further, in this embodiment, the relay lens system 2 has previously been designed so that a conjugated surface formed thereby is curved so as to correct field curvature produced by the ocular optical system 4, thereby enabling minimization of aberration occurring as a result of a reduction in the number of constituent elements of the ocular optical system 4. Accordingly, it is possible to reduce the amount to which the ocular part of the apparatus projects. Since the head-mounted image display apparatus is generally mounted on the observer's head in actual use, if the ocular part projects long forwardly of the observer's face, the display apparatus cannot comfortably be mounted on the observer's head. In addition, since the center of gravity is one-sided forwardly of the observer's face, the apparatus causes the observer to have a stiff neck. In this embodiment, however, it is possible to solve these problems as well as to minimize aberration.

It should be noted that, as shown at (b) in FIG. 2, a mirror 9 may be provided between the relay lens system 2 and the diffusing plate 13 in the arrangement of the second embodiment, thereby enabling the relay lens system 2 and other elements to extend along the observer's head.

The NA enlarging optical element used in the image display apparatus according to the first aspect of the present invention is not necessarily limited to diffusing plates such as those described in the foregoing embodiments but may be a lenticular sheet or the like.

It should be noted that when the observer desires to obtain an image from the outside world as information, a half-mirror, for example, may be provided in place of the mirror 9, which is disposed in front of the observer's eyeball in the arrangement shown in FIG. 1, so that a bundle of rays from the image display device is reflected by the half-mirror, while an outside world image is transmitted through the half-mirror and led toward the observer's eyeball. If a shutter 14 is provided between the half-mirror and the outside world for selectively transmitting or shutting out an outside world image, outside-world image transmitting and shutting-out states can be changed over from one to the other. When the shutter is set in a transmitting state, light from the outside world is transmitted by the shutter and the half-mirror and led into the observer's eyeball, thus enabling the observer to see an outside world image. When the shutter is set in a shut-out state, light rays from the outside world are shut out, and hence no outside light is led into the observer's eyeball. Accordingly, the observer can view an image formed by approximately parallel rays reflected by the half-mirror.

Although in the foregoing embodiments transmissive diffusing plates, i.e., the plane diffusing plate 3 and the curved diffusing plate 13, are used as an NA enlarging element, it should be noted that a reflective diffusing plate may also be used to bend the optical path.

FIGS. 3 to 6 show some examples of the above-described shutter.

Figure 3:
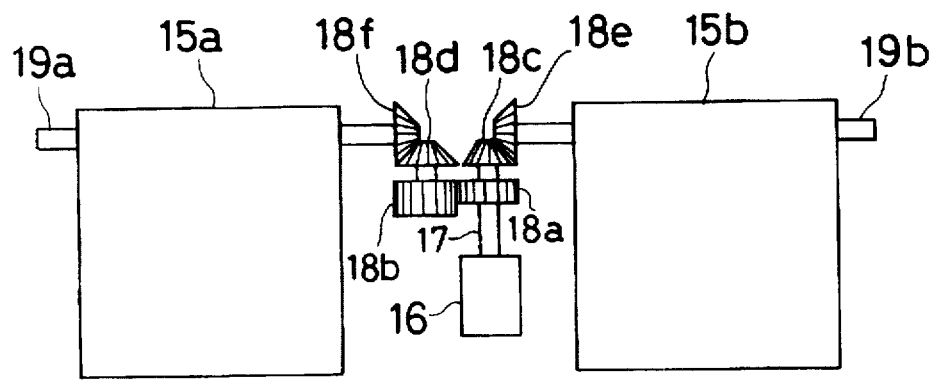
FIG. 3 is a front view showing one example of a shutter which may be employed in the present invention.
Figure 4:
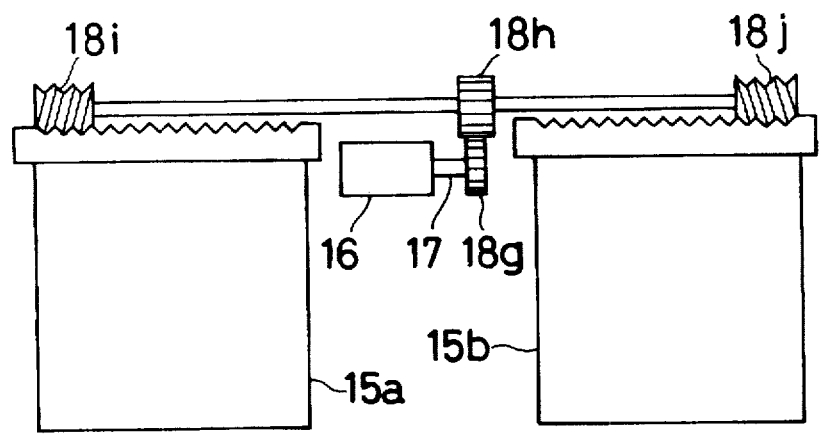
FIG. 4 is a front view showing a modification of the shutter.
Figure 5:
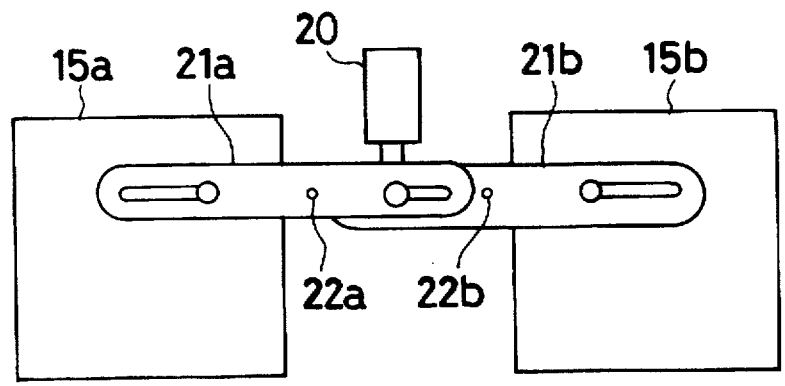
FIG. 5 is a front view showing a modification of the shutter.

Three examples shown in FIGS. 3, 4 and 5 each have opaque shielding members 15a and 15b which are disposed in front of the observer's right and left eyeballs, respectively. These shielding members 15a and 15b are used for the observer's right and left eyes, respectively. The shielding members 15a and 15b are arranged to be driven by a single power source incorporated in a driving device. In this case, a motor 16 is used as a power source.

In the arrangement shown in FIG. 3, when a motor shaft 17 is rotated by activating the motor 16, gears 18a, 18b, 18c, 18d, 18e and 18f rotate in response to the rotation of the motor shaft 17, causing rotating shafts 19a and 19b to rotate. Consequently, the shielding members 15a and 15b for the observer's right and left eyes, which are respectively secured to the rotating shafts 19a and 19b, are pivoted forwardly about the respective shafts 19a and 19b to move out of the observer's visual field. In this way, the position of the shutter is changed from one for transmitting an outside world image to another for shutting out it and vice versa by changing the direction of rotation of the motor shaft 7,.

In the arrangement shown in FIG. 4, when the motor shaft 17 is rotated, gears 18g, 18h, 18i and 18j rotate in response to the rotation of the motor shaft 17, thereby enabling the shielding members 15a and 15b for the observer's right and left eyes to slide horizontally as viewed in the figure.

In the arrangement shown in FIG. 5, a linear motor 20 is used as a power source. A pair of connecting members 21a and 21b are rotatable about fixed pins 22a and 22b, respectively. When the connecting members 21a and 21b are pushed down at one end thereof by the linear motor 20, the other ends of the connecting members 21a and 21b move upwardly. The shielding members 15a and 15 for the observer's right and left eyes are connected to the moving end portions of the connecting members 21a and 21b. Thus, the shielding members 15a and 15b can be slid vertically as viewed in the figure.

Although in the three examples shown in FIGS. 3, 4 and 5 the shielding members 15a and 15b are plate-shaped members, the arrangement may be such that opaque curtains are used as shielding members and these curtains are selectively wound up and unwound by a driving device.

Thus, since the driving device requires only one power source, the above-described arrangements enable a reduction in the overall weight of the apparatus in comparison to an arrangement in which a power source is used for each shielding member.

Figure 6:
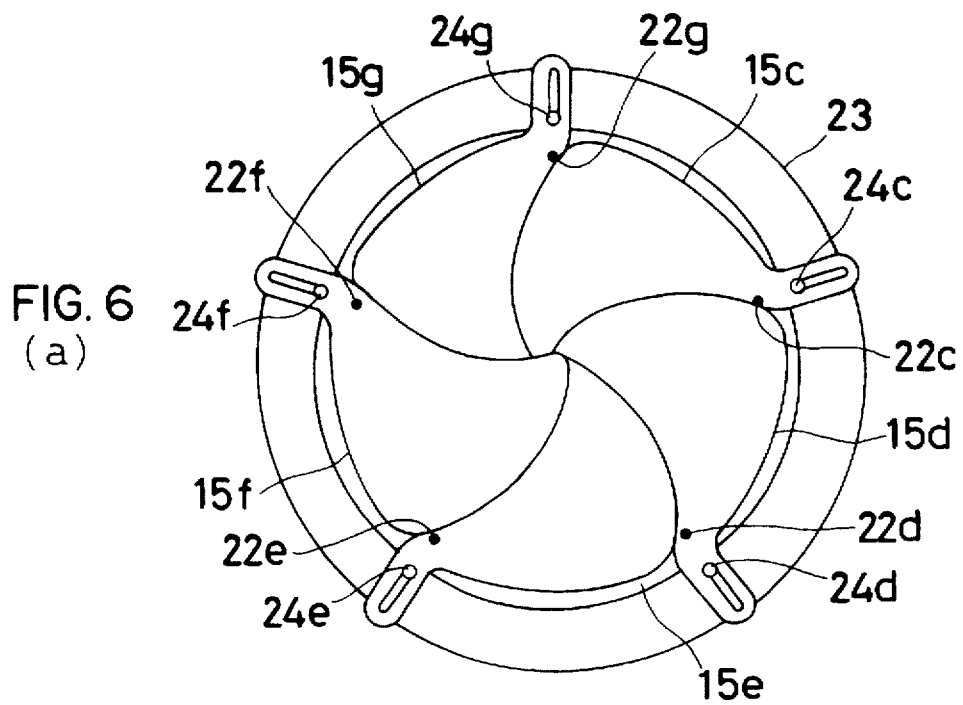
FIG. 6(a) and FIG. 6(b) are is a front view showing a modification of the shutter.
Figure 6:
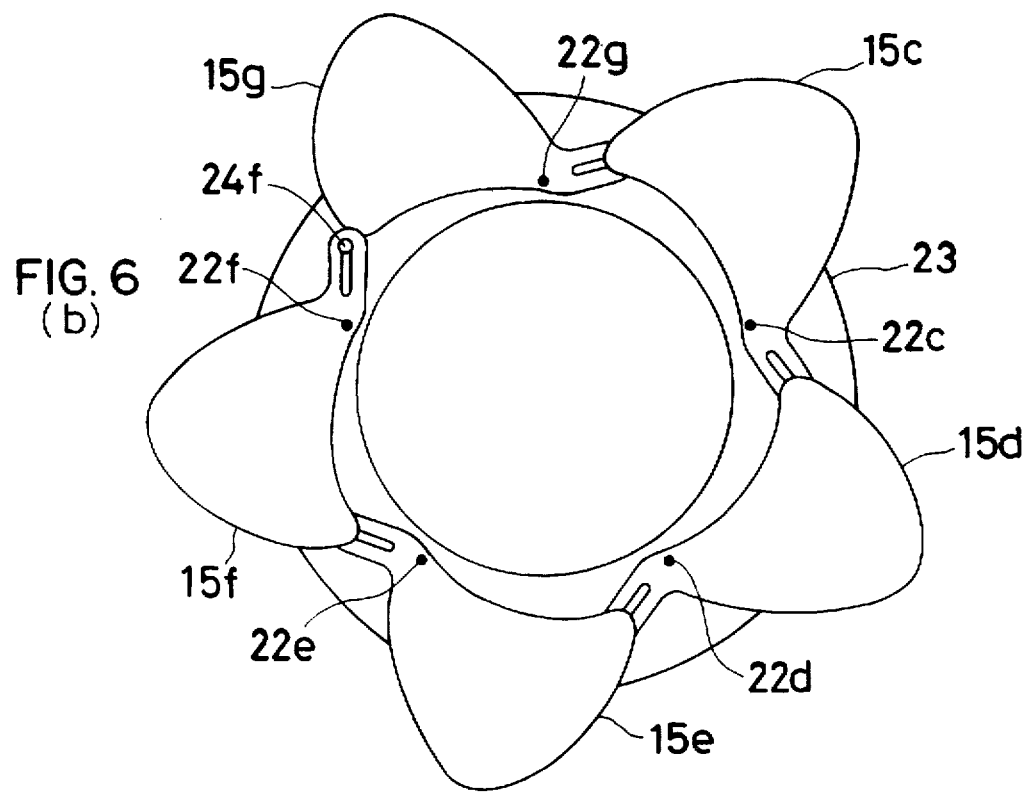

Another example of the shutter in which a shielding member is composed of a plurality of shielding members is shown in FIG. 6.

FIG. 6 is a front view of an example of the shutter that uses a known lens shutter arrangement which is adopted for cameras, showing the shutter in a shut-out position at (a) and also in a transmitting position at (b). Opaque shielding members 15c, 15d, 15e, 15f and 15g are rotatable about fixed pins 22c, 22d, 22e, 22f and 22g, respectively. When a connecting ring 23 is rotated by a power source (not shown), projections 24c, 24d, 24e, 24f and 24g, which are secured to the connecting ring 23, push the proximal ends of the shielding members 15c, 15d, 15e, 15f and 15g, causing these shielding members to rotate to the outer side of the connecting ring 23. In this way, the shutter can be selectively set in the transmitting and shut-out positions.

Although the shutter shown in FIG. 6 is arranged such that the shielding members can be moved to the outer side as in the case of a lens shutter for a camera, it should be noted that the shutter may have shielding members which are arranged in the form of blinds so that when the shielding members lie vertically, light from the outside world is shut out, whereas, when they are moved to lie horizontally, the outside world light is allowed to enter the image display apparatus. It is also possible to use folding screen-shaped shielding members which are arranged to be capable of being folded vertically or horizontally.

Thus, the head-mounted image display apparatus adopts a shutter mechanism wherein the amount to which the shielding members project outwardly is minimized when the shutter is in a transmitting state by arranging a plurality of opaque shielding members as described above. Therefore, it is possible to reduce the overall size of the head-mounted image display apparatus.

Figure 7:
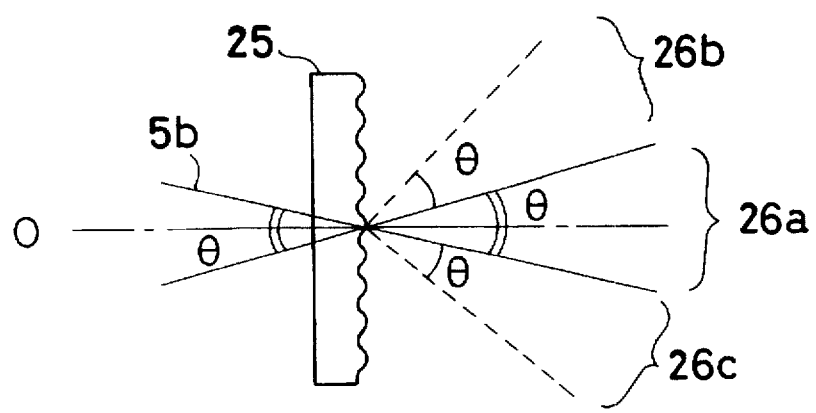
FIG. 7 shows an optical system of a characteristic part of a third embodiment according to the first aspect of the present invention.

Next, a third embodiment according to the first aspect of the present invention will be explained with reference to FIG. 7.

Since the basic arrangement of the third embodiment is the same as the first embodiment, shown in FIG. 1, description thereof is omitted. In the third embodiment, a plane diffraction grating 25 such as that shown in FIG. 7 is provided at approximately right angles to an optical axis O as an NA enlarging element that is disposed at a position (conjugate surface) which is conjugated with the display surface with respect to the relay lens system 2. The plane diffraction grating 25 has grooves cut in the pupil-side surface thereof. The grooves form periodic structural portions in the present invention.

In the third embodiment also, the exit-side NA is enlarged by the diffusing action of the plane diffraction grating 25, which is disposed on the conjugated surface, in the same way as in the first embodiment. The diffusing action takes place as follows: A bundle of rays 5b incident on the plane diffraction grating 25 is diffracted by the action of the plane diffraction grating 25. Consequently, not only zero-order diffracted light 26a but also plus first-order diffracted light 26b and minus first-order diffracted light 26c emerge from the plane diffraction grating 25 at the same angle θ as the angle θ of incidence of the rays 5b. Thus, the incident angle of rays on the entrance side is θ, whereas the emergent angle of rays on the exit side is three times the incident angle, i.e., 3θ. Thus, the NA can be enlarged.

If desired, the NA can be enlarged more than the above by arranging the configuration of the plane diffraction grating 25 so that higher-order diffracted light, i.e., plus and minus second-order diffracted light and plus and minus third-order diffracted light, is also produced. Thus, the NA can be enlarged according to the order of diffraction.

Figure 8:
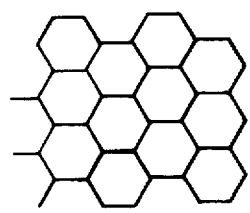
FIG. 8 shows an improved arrangement of the characteristics part of the third embodiment according to the first aspect of the present invention.
Figure 9:
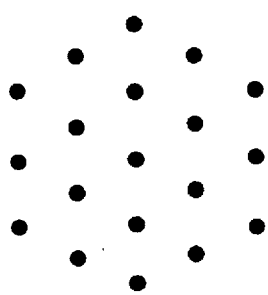
FIG. 9 shows a function of the improved arrangement of the third embodiment according to the first aspect of the present invention.

If the grooves of the above-described plane diffraction grating are formed in a hexagonal honeycomb structure such as that shown in FIG. 8, the diffraction pattern produced by the diffraction action spreads radially in six directions, as shown in FIG. 9. Accordingly, emergent rays spread in all directions with respect to the bundle of incident rays, resulting in a reduction in the difference in intensity between the central and peripheral regions. Thus, a favorable image, which is easy to see, can be provided for the observer.

With a view to reducing the roughness of the diffraction surface of the diffraction grating, which is noticeable when a bundle of rays of low NA is incident on the diffraction grating, uneven patterns which are defined by the grooves cut in the grating surface should preferably be made contiguous with each other as gently as possible.

Although in the third embodiment a plane diffraction grating is shown as a diffraction grating serving as a member having periodic structural portions, it should be noted that it is also possible to use a concave diffraction grating, a toroidal grating, a Fresnel zone plate, etc. These diffraction gratings may be of either the transmissive or reflective type.

When a member having periodic structural portions is used as an NA enlarging element in a head-mounted image display apparatus designed to project an image on an observer's eyeball as an enlarged image, as the image is enlarged, the periodic structural portions of the member disposed on the conjugated surface are also enlarged. Therefore, the pitch of the periodic structural portions (e.g., the grating pitch of a diffraction grating) should preferably be set at a small value so that the structural portions are as inconspicuous as possible.

When used as an NA enlarging element, a member having periodic structural portions is preferable to a diffusing plate from the viewpoint of improving the image quality.

A fourth embodiment of the image display apparatus according to the first aspect of the present invention will be explained below with reference to FIG. 10.

The fourth embodiment is similar to the third embodiment except that the plane diffraction grating 25 is shifted on the optical axis from a position conjugated with the display surface with respect to the relay lens system 2. Since the basic arrangement of the fourth embodiment is similar to that of the first embodiment, shown in FIG. 1, in the same way as in the case of the third embodiment, description thereof is omitted. Referring to (a) in FIG. 10, which schematically shows a characteristic part of the fourth embodiment, the plane diffraction grating 25 is parallel-displaced on the optical axis O by a distance l toward the pupil (not shown) from the surface 27 conjugated with the LCD 1 with respect to the relay lens system 2. The diffraction action of the plane diffraction grating 25 will be briefly explained below with respect to only the axial principal and marginal rays in the bundle of incident rays 5b. The bundle of rays passing through the conjugate surface 27 is diffracted by the diffraction surface of the plane diffraction grating 25 into zero-order diffracted light (28a, 28b and 28c), plus first-order diffracted light (29a, 29b and 29c), and minus first-order diffracted light (30a, 30b and 30c).

Figure 10:
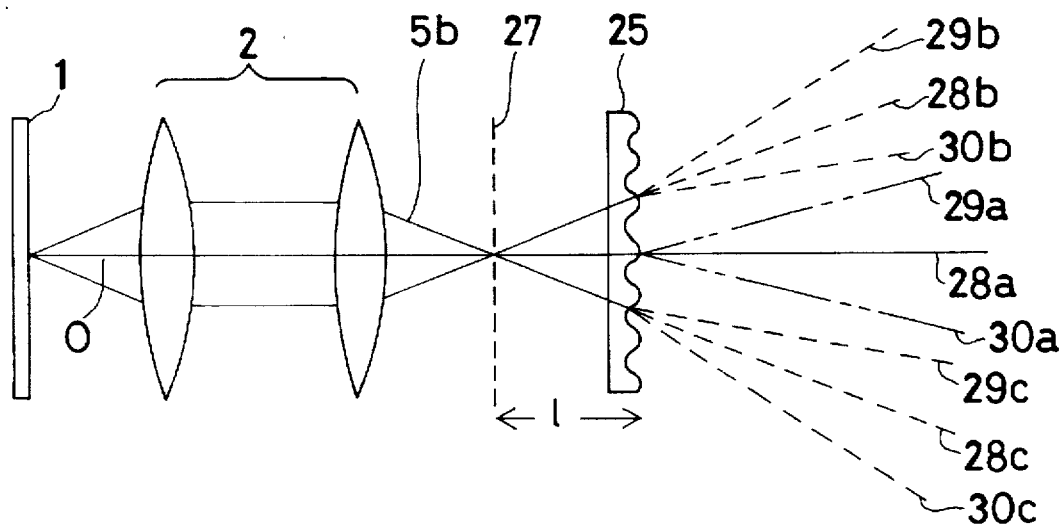
FIG. 10(a) and FIG. 10(b) show an optical system of a fourth embodiment according to the first aspect of the present invention.
Figure 10:
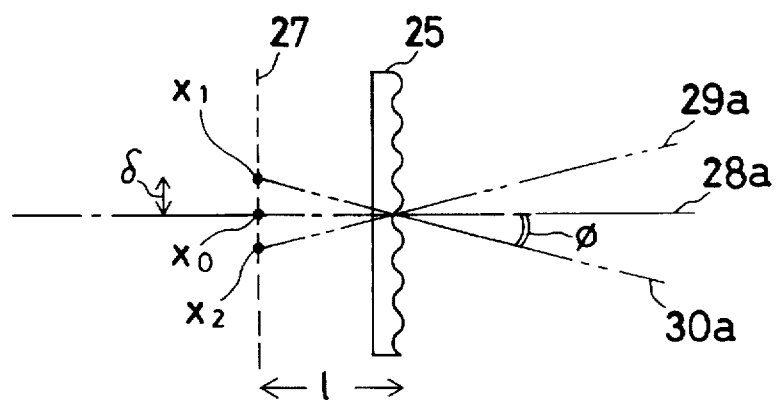

Among the above-described rays, only the axial principal ray is extracted and shown at (b) in FIG. 10 for the purpose of explaining the above-described action more specifically. The angle of diffraction (the angle between zero-order diffracted light and plus or minus first-order diffracted light) at this time is defined as $\phi$. The plus and minus first-order diffracted light rays (29a and 30a) are imaginarily prolonged as far as the conjugate surface 27, and the points of intersection of the conjugate surface 27 and the imaginary prolonged lines of the plus and minus first-order diffracted light rays (29a and 30a) are defined as $X_2$ and $X_1$, respectively. In addition, the point of intersection of the axial principal ray and the conjugate surface 27 is defined as $X_0$. Let us take notice of only the above-described minus first-order diffracted light, for example. Although the minus first-order diffracted light 30a of diffraction angle $\phi$ is produced from the axial principal ray by the diffraction action of the plane diffraction grating 25, when the light 30a is seen alone, it looks as if it were a ray emanating from the point $X_1$ on the conjugate surface 27. That is, the plane diffraction grating 25 transmits the axial principal ray in the bundle of incident rays 5b as zero-order diffracted light (28a) and also carries out a function which is equivalent to shifting the axial principal ray to a ray (minus first-order diffracted light 30a) emanating from the point $X_1$ on the conjugate surface 27 which is distance $\delta$ apart from the point $X_0$ and also shifting the axial principal ray to a ray (plus first-order diffracted light 29a) emanating from the point $X_2$ which is in symmetry with the point $X_2$ with respect to the optical axis.

The amount of shift $\delta$ may be expressed as follows:

$\delta = l \tan \phi$

Accordingly, the observer views not only an image formed by the zero-order diffracted light but also images formed by the plus and minus first-order diffracted light, which are $\pm\delta$ apart from the above image, in a redundant manner.

With this arrangement, although the resolution of the image for observation lowers, the high-frequency component is cut off. Accordingly, the boundaries between the pixels on the display surface of the LCD 1 become unsharp, and thus the ease of observation of the displayed image is improved.

Figure 11A:
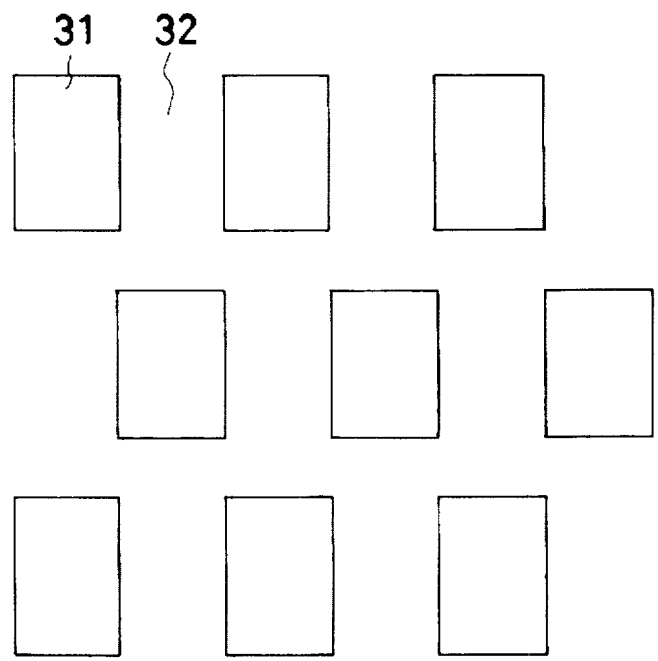
FIG. 11(a) and FIG. 11(b) show a function of the fourth embodiment according to the first aspect of the present invention.
Figure 11B:
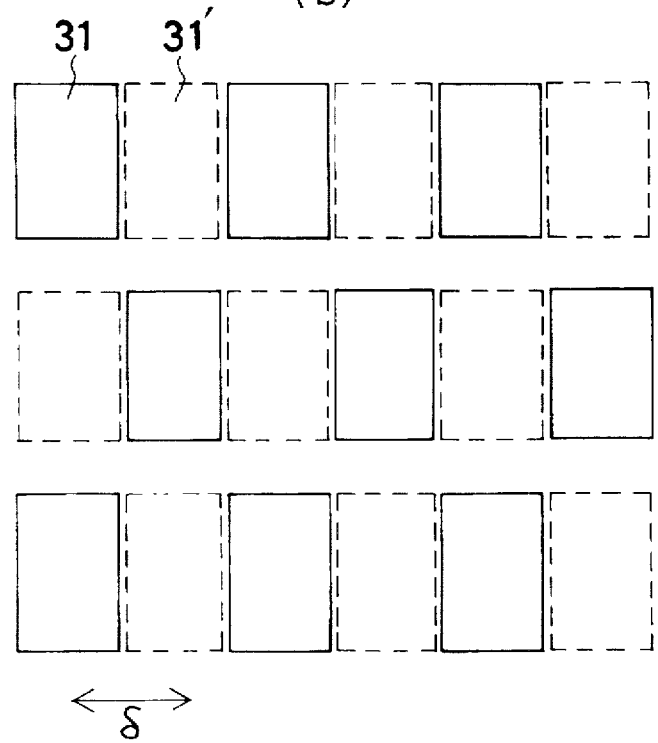

Referring to (a) in FIG. 11, which schematically shows a part of the arrangement of the LCD 1, the display surface of the LCD 1 is composed of pixels 31 for forming an image, and a dark field 32 containing signal electrodes, switching elements, etc. for driving the pixels 31. Accordingly, if the amount of shift $\delta$ is set so that images formed by higher-order diffracted light are offset from the pixels 31 by a distance corresponding to one pixel of the LCD 1, i.e., a half pitch, as shown by the broken lines 31' at (b) in FIG. 11, the dark field 32 lying between the pixels 31 becomes inconspicuous. Therefore, it is preferable to set the amount of shift $\delta$ as described above.

For example, assuming that a plane diffraction grating whose order of diffraction is 1 and whose angle of diffraction $\phi$ is 20° is used and the pixel pitch of the LCD 1 is 60 μm, the amount of shift $\delta$ is 30 μm, which is equal to a half pixel pitch. Consequently, the amount l by which the plane diffraction grating is to be displaced from the conjugate surface can be calculated from the above equation and determined to be l=82 μm. Accordingly, if the plane diffraction grating is installed 82 μm apart from the conjugate surface, it is possible to construct an image display apparatus that uses an LCD having a pixel pitch of 60 μm and a plane diffraction grating having a diffraction angle of 20°.

Although in the fourth embodiment the amount of shift $\delta$ is defined as a half pixel pitch, it is not necessarily limited thereto. It is preferable with a view to minimizing the dark field that the amount of shift $\delta$ should be 0.7 to 0.9 times the pixel pitch.

Although in the fourth embodiment the conjugate surface 27 is provided on the LCD side, while the plane diffraction grating 25 is provided on the pupil side, similar action and effect can be obtained even if the positional relationship between the conjugate surface 27 and the plane diffraction grating 25 is inverted, as a matter of course.

The relay lens systems 2 shown in the first to fourth embodiments are all arranged such that the magnification has been fixed to a predetermined level, and an image of the LCD 1 is relayed to the conjugate surface only at the fixed magnification. However, the relay lens system 2 may be formed by using a variable-magnification lens system. A fifth embodiment will be explained below with reference to FIG. 12. It should be noted that the same constituent elements as those in the first embodiment are denoted by the same reference numerals, and description thereof is omitted.

Figure 13A:
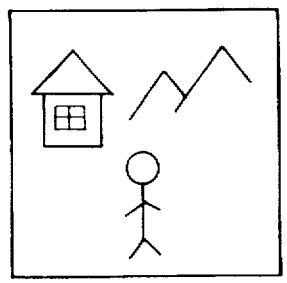
FIG. 13(a) and 13(b) show a function of the fifth embodiment according to the first aspect of the present invention.
Figure 13B:
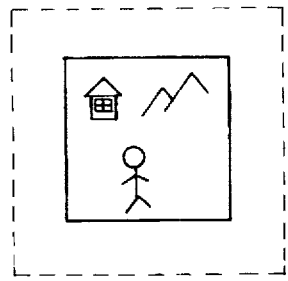

In the fifth embodiment, a lens system that constitutes the relay lens system 2 is composed of a positive 1-st lens group 33 and a negative 2-nd lens group 34, as shown in FIG. 12. By moving the positive 1-st lens group on the optical axis toward the pupil, while moving the negative 2-nd lens group on the optical axis toward the LCD 1, the magnification (imaging magnification) of an image of the LCD 1 formed on the conjugated surface can be varied so that an image of high magnification is changed into an image of low magnification. FIG. 13 shows images seen from the observer with the magnification varied as described above. For example, when the observer desires to see a powerful wide-screen image to enjoy a movie or the like, the arrangement of the relay lens system 2 is set for a high magnification, as shown at (a) in FIG. 12. Thus, the observer can see an image of high magnification, as shown at (a) in FIG. 13. When the observer wants to reduce the size of the image area to view an outside world image through the resulting space, the arrangement of the relay lens system 2 is set for a low magnification, as shown at (b) in FIG. 12. Consequently, the observer can view an image of low magnification, as shown at (b) in FIG. 13, and while doing so, he or she can see an outside world image through a space resulting from the reduction in size of the image area via a half-mirror and a shutter 14.

Thus, in the fifth embodiment, the relay lens system 2 has a variable-magnification arrangement and enables the image magnification to be changed. Accordingly, as the image magnification changes, the angle of incidence of the bundle of rays 5b also changes.

If no NA enlarging element is present, the size of the exit pupil 10 changes as the incident angle changes. Thus, as the incident angle decreases, the size of the exit pupil unavoidably decreases, and it becomes likely that the observer will lose sight of the displayed image. However, if the diffusing plate 3 is used as an NA enlarging element on the conjugate surface as in the arrangement of the fifth embodiment, the NA of the bundle of incident rays is enlarged in a predetermined ratio, and it is therefore possible to enlarge the NA in a predetermined ratio even if the incident angle of the rays is small and hence possible to increase the size of the exit pupil. Since the ratio of NA enlargement by the diffusing plate is determined by the arrangement of the diffusing plate, the image varied in magnification is led to the observer with the enlarged NA maintained as it is. Thus, by virtue of the arrangement of the fifth embodiment, the observer can enjoy a change of the magnification with the exit pupil increased in size by enlarging the NA.

It should be noted that the variable-magnification relay lens system 2 may be arranged to allow a plurality of stepwise magnification changes. Alternatively, it may be arranged in the form of a zoom lens system which enables the magnification to be continuously varied.

Figure 14A:
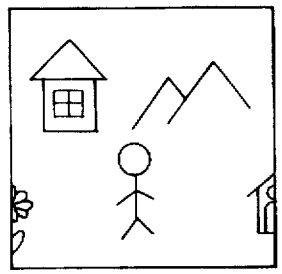
FIG. 14(a) and 14(b) show a function of an improvement on the image display apparatus according to the first aspect of the present invention.
Figure 14B:
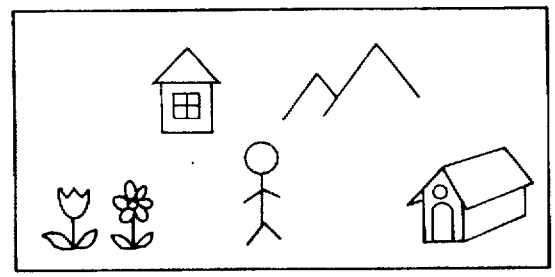

In addition, a lens having a toric surface may be disposed inside the fixed-magnification relay lens system 2 shown in the first to fourth embodiments or inside the variable-magnification relay lens system 2 shown in the fifth embodiment. By rotating the lens having a toric surface about the optical axis and in a plane approximately perpendicular to the optical axis, the magnification in a desired direction in the image surface can be changed to adjust the aspect ratio. For example, if the relay lens system 2 is arranged so that the aspect ratio is changed from 4:3 to 16:9 by rotating the lens through 90°, an ordinary image, e.g., a TV image, as shown at (a) in FIG. 14, and a high-definition TV image as shown at (b) in the figure can be changed over from one to the other. It should be noted that the lens having a toric surface may be displaced by a combination of a cylindrical convex lens and a cylindrical concave lens.

Figure 15:
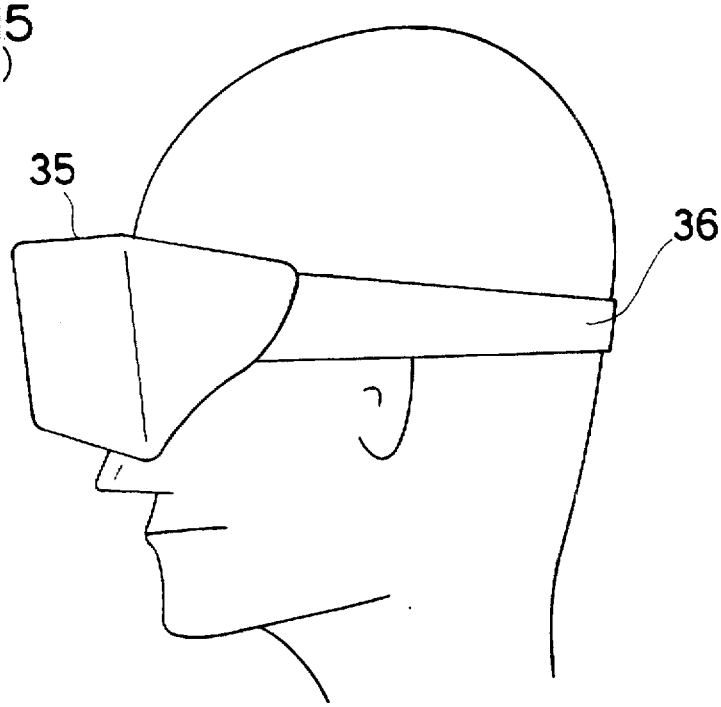
FIG. 15(a) and FIG. 15(b) show the general arrangement of the image display apparatus according to the first aspect of the present invention.
Figure 15:
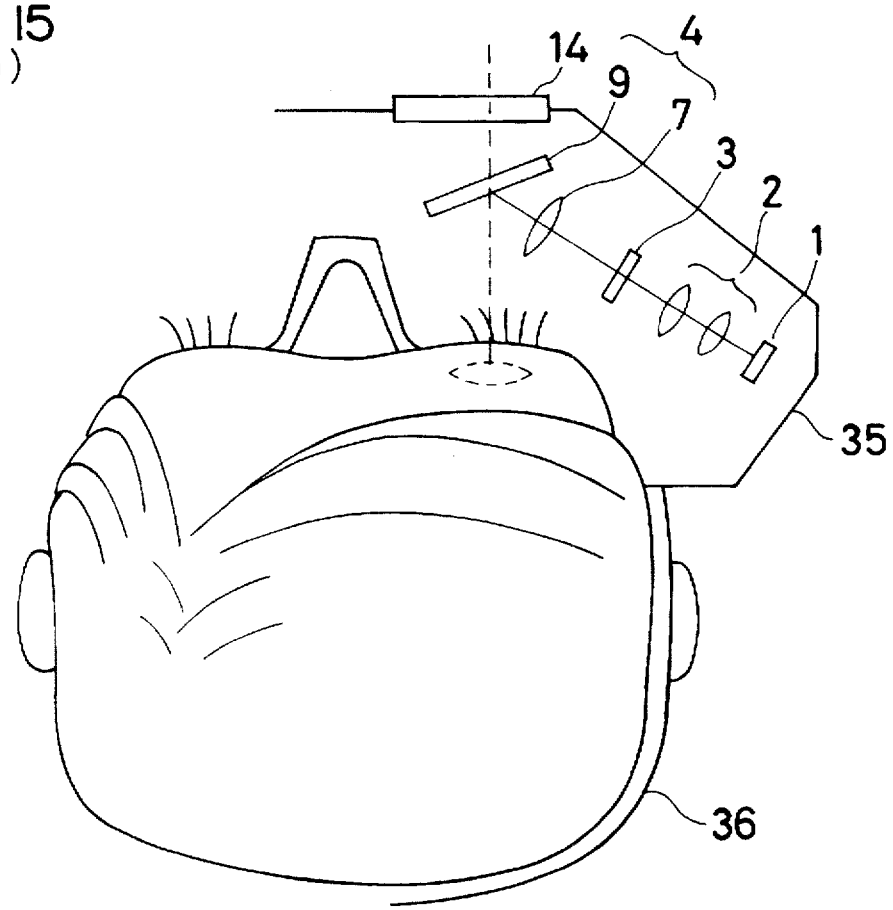

The head-mounted image display apparatus according to the first aspect of the present invention is arranged so that a face-mounted unit 35, which contains the above-described arrangement having an NA enlarging element disposed at or near the conjugate surface, is mounted on the observer's face, as shown, for example, in FIG. 15, and a support member 36 is connected to the face-mounted unit 35 to support it on the observer's head.

Some embodiments of the head-mounted image display apparatus according to the second aspect of the present invention will be described below. Prior to the description of the embodiments, the principle of the head-mounted image display apparatus according to the second aspect of the present invention will be briefly explained. The head-mounted image display apparatus includes a transmissive display device, an illuminator for illuminating the transmissive display device with light which is not in a diffused state but in an approximately collimated state, and an ocular optical system. Either a diffusing optical element or an optical fiber bundle is disposed between the transmissive display device and the ocular optical system. The entrance or exit surface of the diffusing optical element or the exit surface of the optical fiber bundle has a surface configuration that fits the configuration of field curvature involved in the ocular optical system. In the case of a diffusing optical element, the above-described surface is formed as a diffusing surface. An image of the transmissive display device is projected on the diffusing surface of the diffusing optical element or on the entrance surface of the optical fiber bundle by the illuminator. The diffusing surface of the diffusing optical system or the exit surface of the optical fiber bundle serves as a secondary display surface. Since the object surface has a configuration that compensates for the field curvature of the ocular optical system, the image as observed through the ocular optical system is corrected for the field curvature and appears to be a flat image.

Figure 16:
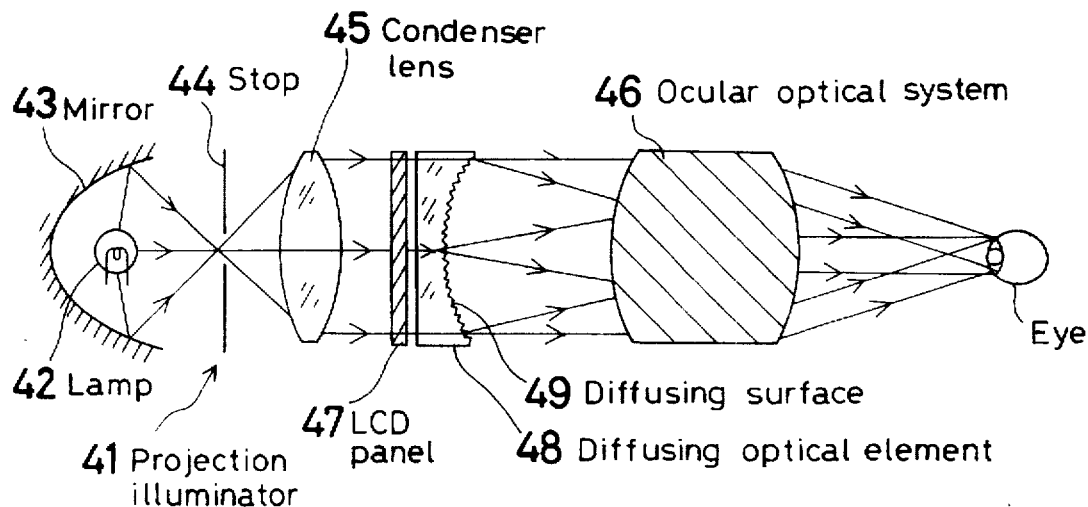
FIG. 16 is a sectional view showing an optical system of a first embodiment of a head-mounted image display apparatus according to a second aspect of the present invention.
Figure 17:
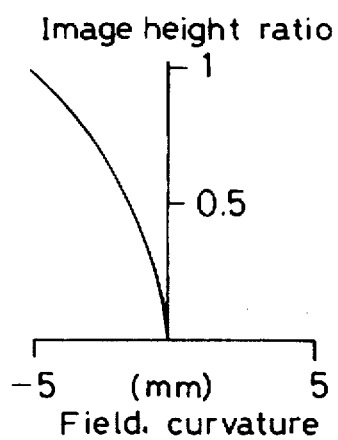
FIG. 17 graphically shows field curvature in an ocular optical system shown in FIG. 16.

FIG. 16 is a sectional view of an optical system for one observer's eye in a first embodiment of the head-mounted image display apparatus according to the second aspect of the present invention. The optical system has a projection illuminator 41 which includes a small-sized lamp 42, and an elliptical mirror 43 having the lamp 42 disposed at one focal point thereof to focus a bundle of rays emitted from the lamp 42 onto the other focal point. The illuminator 41 further includes a stop 44 with a small aperture which is disposed at the second focal point of the elliptical mirror 43, and a condenser lens 45 for converting a bundle of rays emanating from the stop 44 in a state close to coherent light into approximately parallel rays. The optical system further has an ocular optical system 46 which is formed by using an optical system composed, for example, of at least one lens and having field curvature such as that shown in the graph of FIG. 17. Between the projection illuminator 41 and the ocular optical system 46 are provided a liquid crystal display (LCD) panel 47 and a diffusing optical system 48 which is disposed in close proximity to the LCD panel 47 and which has an exit surface 49 formed as a diffusing surface. When the field curvature of the ocular optical system 46 is revealed to be negative by backward tracing, the diffusing surface 49 is formed as a concave surface in conformity to it, whereas, when the field curvature is positive, the diffusing surface 49 is a convex surface in conformity to it. It should be noted that the surface 49 may be formed as a spherical surface approximated to the configuration of the field curvature from the viewpoint of ease of processing. In the case of the arrangement shown in FIG. 16, the field curvature of the ocular optical system 46 is negative, as shown in FIG. 17, and hence the diffusing surface 49 is formed as a concave surface.

In the above-described arrangement, light emitted from the lamp 42 is reflected by the elliptical mirror 43 and focused onto one point at the position of the stop 44. Light passing through the aperture of the stop 44 is applied to the surface of the LCD panel 47 through the condenser lens 45. Since rays of light emerging from the condenser lens 45 are parallel rays, light that is transmitted through the LCD panel 47 and spatially modulated by the image displayed thereon is projected onto the diffusing surface 49 of the diffusing optical system 48 without intersecting each other. Diffused light emanates from the diffusing surface 49 serving as a secondary display surface. If the diffusing surface 49 is disposed near the front focal point of the ocular optical system 46, the image on the diffusing surface 49 can be observed as a flat image.

By virtue of the above-described arrangement, a planar LCD panel 47 can be used, and even if an ocular optical system 46 having field curvature is used, the field curvature can be satisfactorily corrected.

Figure 18:
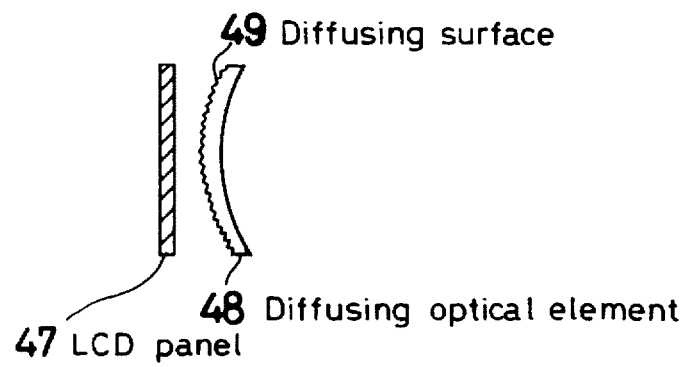
FIG. 18 is a fragmentary sectional view showing a diffusing optical element in a modification of the embodiment shown in FIG. 16.

It should be noted that the diffusing optical element 48 is not necessarily limited to one that has a diffusing surface 49 formed on the exit side thereof, and that it is also possible to use a diffusing optical element having a diffusing surface formed on the entrance side thereof, as shown in FIG. 18.

Figure 19:
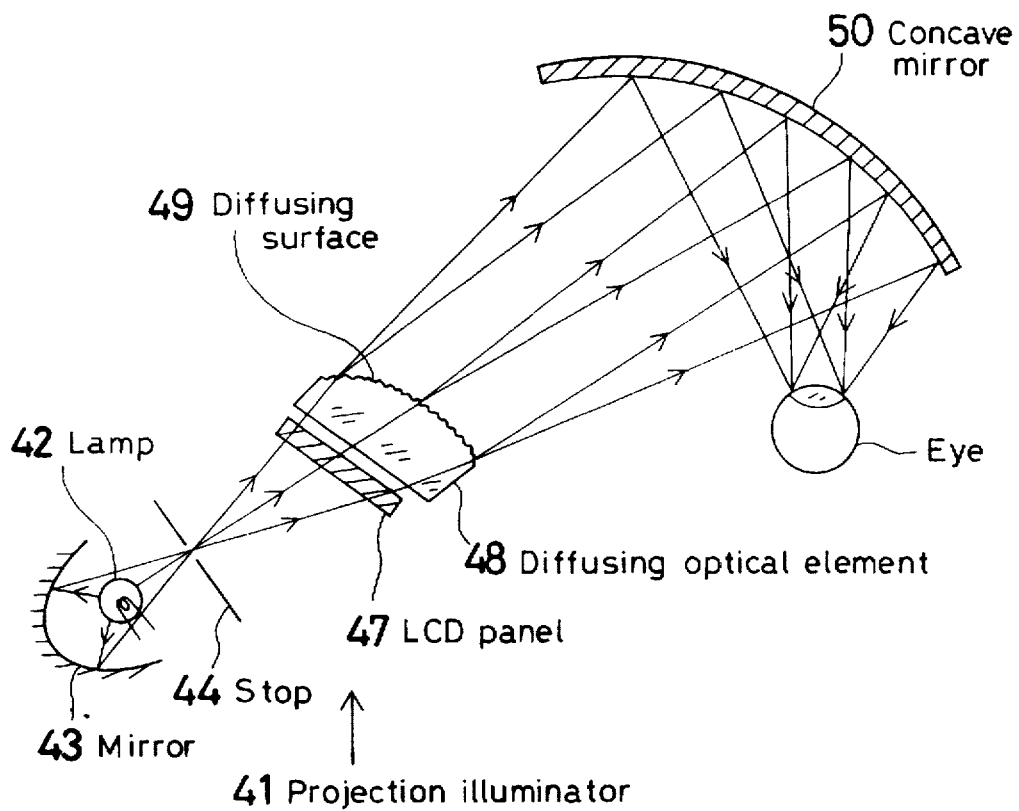
FIG. 19 is a sectional view showing an optical system of a second embodiment according to the second aspect of the present invention.

FIG. 19 is a sectional view of an optical system in a second embodiment of the head-mounted image display apparatus according to the second aspect of the present invention. This embodiment uses a decentered optical system as an ocular optical system. FIG. 19 shows an arrangement in which a concave mirror 50 alone is used as an ocular optical system, as a simple example. Since the basic arrangement and function of the this embodiment are the same as those of the first embodiment shown in FIG. 16, only the points in which the second embodiment differs from the first embodiment will be explained below. The surface configuration of the mirror 43 in the projection illuminator 41 is optimized so that light emitted from the lamp 42 is focused onto one point at the position of the stop 44, and the angle of incidence of light on the LCD panel 47 is also adjusted. In this case, a condenser lens 45 may be disposed in the same way as in the embodiment shown in FIG. 16. However, when the angle of incidence is made small as in the case of the arrangement shown in FIG. 19, no condenser lens 45 is needed as in the illustrated arrangement. In the decentered optical system 50, field curvature is not in axial symmetry. Therefore, the diffusing surface 49 of the diffusing optical system 48 is curved in conformity to-the field curvature.

The action and effect of this embodiment are essentially the same as those of the first embodiment. In this embodiment, however, rays of light emitted from the projection illuminator 41 to illuminate the LCD panel 47 are not parallel rays but divergent rays, and it is therefore possible to reduce the size of the LCD panel 47 correspondingly. In addition, since the condenser lens 45 is omitted, the size of the projection illuminator 41 can be reduced correspondingly. Thus, the head-mounted image display apparatus itself can be made compact, advantageously.

It should be noted that in the first and second embodiments a microprism array or a microlens array may be used in place of the condenser lens 45 in the projection illuminator 41 to effect similar illumination.

Figure 20:
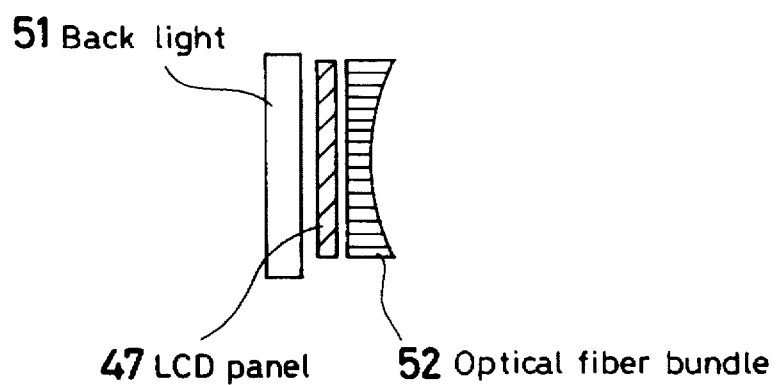
FIG. 20 is a sectional view of an essential part of an optical system of a third embodiment according to the second aspect of the present invention.

FIG. 20 is a sectional view of an optical system constituting an essential part of a third embodiment of the head-mounted image display apparatus according to the second aspect of the present invention. This embodiment is also basically similar to the first and second embodiments. In this embodiment, however, a back light 51, which is an ordinary diffuse light source, is used as the projection illuminator 41, and the diffusing optical element 48 is replaced by an optical fiber bundle 52. It should be noted that the projection illuminator 41 may be the same as that used in the first or second embodiment. The optical fiber bundle 52 has a flat entrance surface. The surface of the optical fiber bundle 52 that faces the ocular optical system 46 or 50 is arranged to fit the configuration of field curvature involved in the ocular optical system 46 or 50. The use of the optical fiber bundle 52 as a diffusing optical element eliminates the limitation on the condition of light for illuminating the LCD panel 47.

FIG. 21 is a sectional view of an optical system constituting an essential part of a fourth embodiment. The basic arrangement and function of this embodiment are similar to those of the first and second embodiments. The feature of this embodiment resides in that the LCD panel 47 and a Fresnel lens 53 are disposed between the projection illuminator 41 and the diffusing optical element 48, and that the LCD panel 47 and the Fresnel lens 53 are movable along the optical axis in association with each other, as shown in FIG. 22. In this embodiment, a Fresnel lens of negative power is used as the Fresnel lens 53. When the LCD panel 47 and the Fresnel lens 53 are positioned closer to the projection illuminator 41, as shown at (a) in FIG. 22, an image enlarged to a relatively large size is projected by the diffusing surface 49. When the LCD panel 47 and the Fresnel lens 53 are positioned closer to the diffusing optical element 48, an image enlarged to a relatively small size is projected by the diffusing surface 49. Thus, it is possible to realize a function that enables variation of the image area size.

It is also possible to realize a function that enables variation of the aspect ratio of the image area by replacing the Fresnel lens 53 with a cylindrical lens so that an image displayed on the LCD panel 47 can be compressed or extended either heightwise or widthwise, and adjusting the degree of compression or extension of the image displayed on the LCD panel 47 in accordance with the position in the direction of the optical axis of the cylindrical lens.

Figure 23:
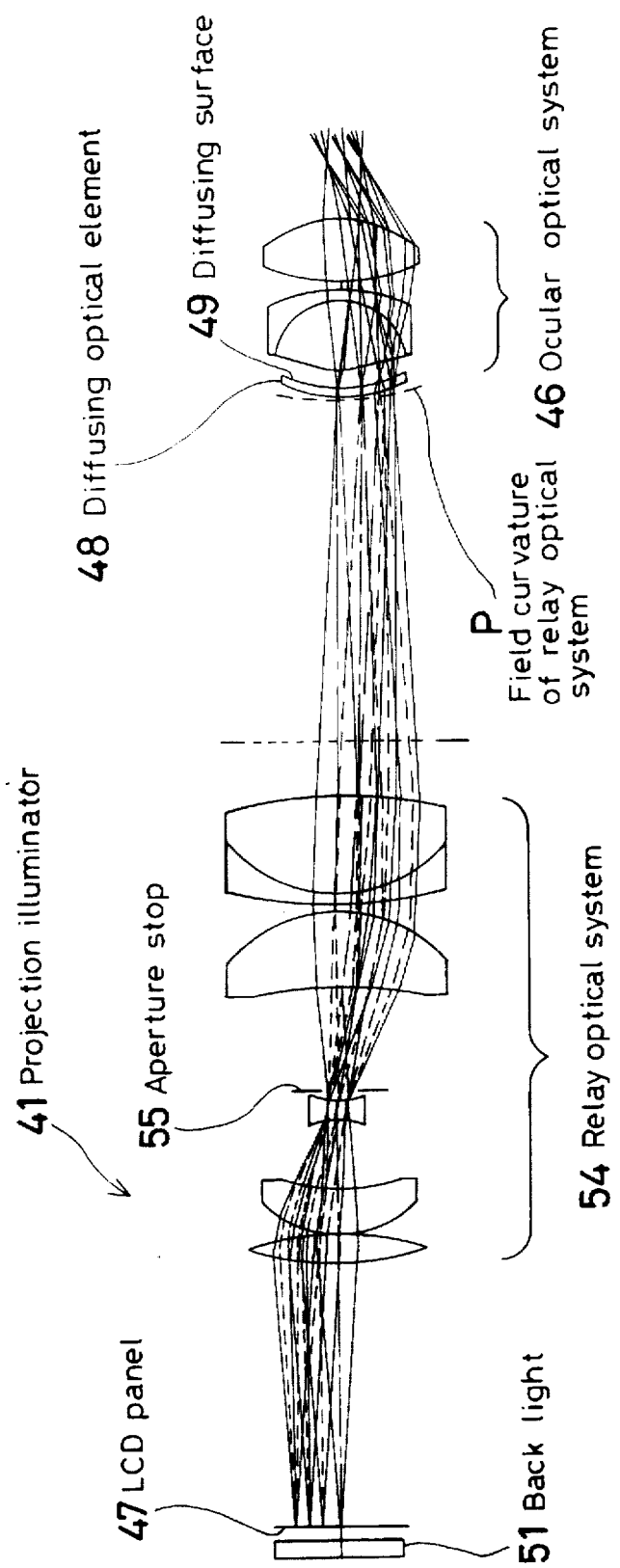
FIG. 23 is a sectional view showing an optical system of a fifth embodiment according to the second aspect of the present invention.
Figure 24:
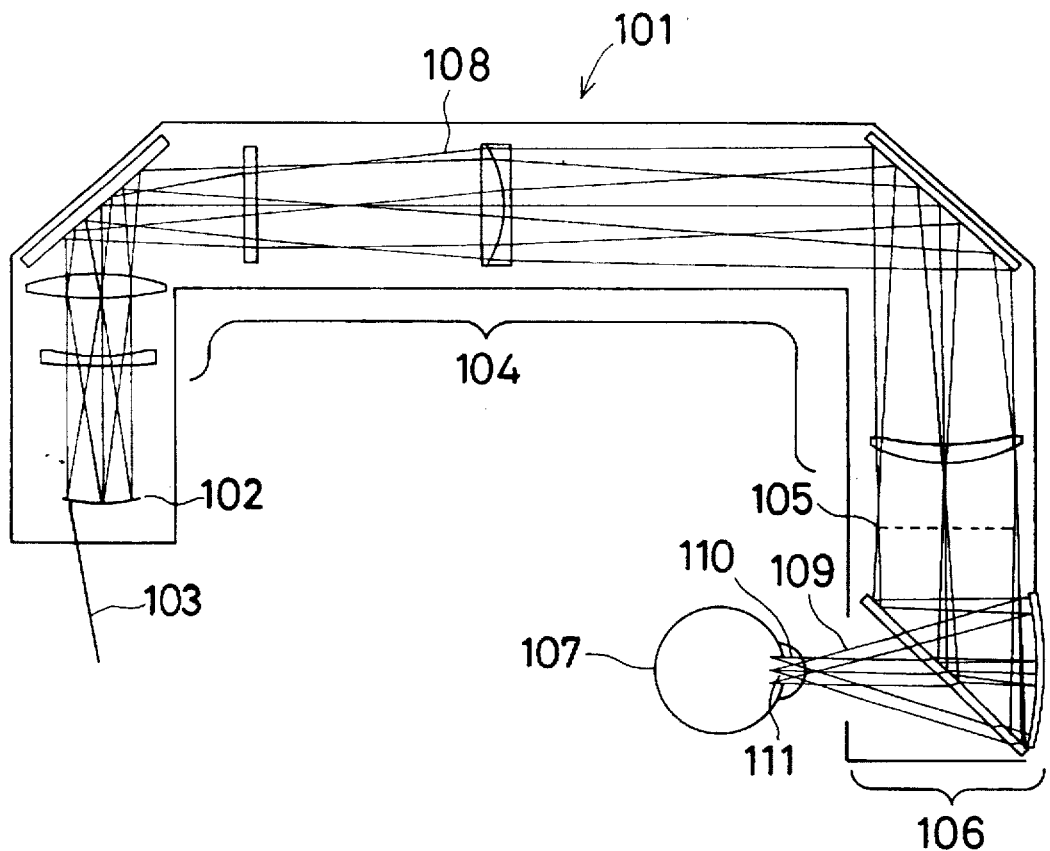
FIG. 24 is a fragmentary sectional view showing a conventional head-mounted image display apparatus in a state where it is actually used by an observer.
Figure 25A:
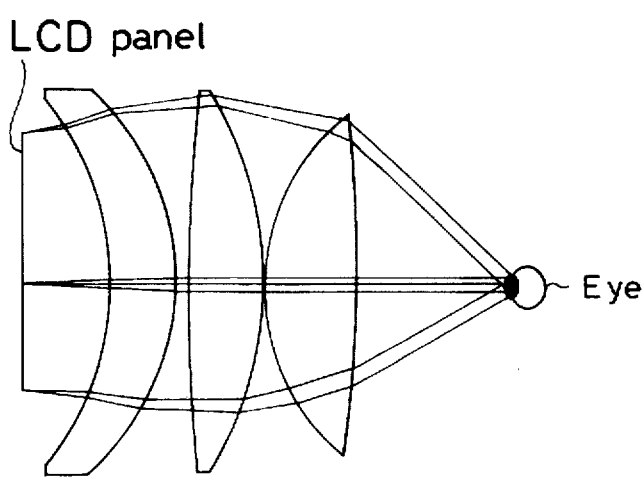
FIG. 25(a) and FIG. (b) show a conventional magnifier-type ocular optical system in a sectional view and graphically shows field curvature produced by the ocular optical system.
Figure 25B:
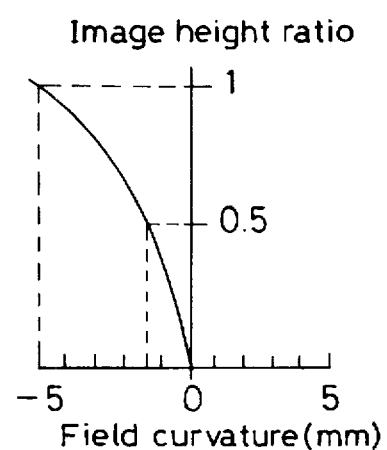

FIG. 23 is a sectional view of an optical system of a fifth embodiment of the head-mounted image display apparatus according to the second aspect of the present invention. This embodiment is the same as the embodiment shown in FIG. 16 in terms of the arrangement and function of a part of the apparatus which extends from the diffusing optical element 48 to the observer's eye, but these two embodiments are different from each other in the method of image projection effected by a part of the apparatus which extends from the projection illuminator 41 to the diffusing optical element 48. That is, a planar back light 51 is used as the projection illuminator 41, and a relay optical system 54 is disposed between the LCD panel 47 and the diffusing optical element 48. The relay optical system 54 projects an image displayed on the LCD panel 47 onto the diffusing surface 49 of the diffusing optical element 48. The numerical aperture of the relay optical system 54 has previously been reduced so that the difference between the field curvature P of the relay optical system 54 and the field curvature of the ocular optical system 46 falls within the focal depth of the relay optical system 54. Thus, an image displayed on the LCD panel 47 can be projected on the diffusing surface 49 of the diffusing optical element 48 as long as the field curvature of the relay optical system 54 is approximately coincident with the field curvature of the ocular optical system 46 even if it is not completely coincident with the latter. This embodiment differs from the other embodiments in that an image displayed on the LCD panel 47 is optically imaged and projected on the diffusing surface 49 curved so as to compensate for the field curvature of the ocular optical system 46.

The following is a description of a sixth embodiment of the head-mounted image display apparatus according to the second aspect of the present invention, in which an optical element having a periodic structure is used in place of the diffusing optical element 48 in the foregoing embodiments. Specific examples of an optical element having a periodic structure are diffraction grating optical elements. Diffraction grating optical elements include a binary type, a sinusoidal type, a microlens array type, etc. The arrangement of grating patterns (as viewed from the front) includes an arrangement in which diffraction grating elements are placed in a celllike pattern, and another arrangement in which diffraction grating elements are placed in a honeycomb pattern. It should be noted that, in the head-mounted image display apparatus of the present invention, the secondary display surface (diffusing surface) of the diffraction grating optical element is enlarged by the ocular optical system 46 or the concave mirror 50 for observation, and therefore the grating pitch must be reduced to such an extent that the diffraction grating structure is not noticeable.

Conventionally used diffusing surfaces are gritty. Therefore, light emerging from such a diffusing surface serving as a secondary display surface is diffused in random directions. When the numerical aperture of light incident on such a diffusing surface is small, there may be regions from which no light reaches the observer's eye. If such a phenomenon markedly occurs, the image area for observation looks rough, causing the image quality to be degraded. However, the diffraction grating optical element used in this embodiment enables the direction of diffused light to be controlled and hence makes it possible to effectively utilize diffused light emerging from the entire area of the secondary display surface (diffusing surface). When a sinusoidal diffraction grating is used, for example, zero-order, plus first-order and minus first-order diffracted light rays emerge therefrom, and these diffracted rays function as diffused light.

Thus, in this embodiment, the efficiency of utilization of diffused light improves in comparison to a diffusing optical element having a gritty diffusing surface. Accordingly, it is possible to prevent lowering of the brightness and to eliminate an image quality degrading factor such as the roughness of the image area.

In the foregoing head-mounted image display apparatus according to the second aspect of the present invention also, a face-mounted unit 35, which contains an arrangement including the diffusing optical element 48 or the optical fiber bundle 53 for correcting field curvature, is mounted on the observer's face, and a support member 36 is connected to the face-mounted unit 35 for supporting it on the observer's head in the same way as in the head-mounted image display apparatus according to the first aspect of the present invention as shown, for example, at (a) in FIG. 15.

Although the head-mounted image display apparatuses according to the first and second aspects of the present invention have been described above by way of some embodiments, it should be noted that the present invention is not necessarily limited to these embodiments, and that various changes and modifications may be imparted thereto.

As will be clear from the foregoing description, it is possible according to the first aspect of the present invention to provide a head-mounted image display apparatus having an enlarged exit pupil without causing an increase in the size of the relay optical system or a reduction in the size of the projected image.

In the head-mounted image display apparatuses according to the second aspect of the present invention, either a diffusing optical element or an optical fiber bundle which has an entrance or exit surface formed as a diffusing surface is disposed between the transmissive display device and the ocular optical system. The diffusing surface of the diffusing optical element or the exit surface of the optical fiber bundle has a configuration which fits field curvature produced by the ocular optical system. Accordingly, an image displayed on the transmissive image display device is converted by the diffusing optical element or the optical fiber bundle into a secondary display image formed on the diffusing surface or the exit surface adapted for compensating for the field curvature of the ocular optical system. Thus, even if the ocular optical system, which enlarges the secondary display image for observation, involves field curvature, it is possible to observe an image of high resolution which is sharp over the entire field angle.

What we claim is:

1. An image display apparatus comprising:
   an illuminating light source;
   a transmissive image display device for displaying an image by transmitting light from said illuminating light source;
   an ocular optical system for projecting the image formed by said transmissive image display device inside an observer's eyeball as an enlarged image; and
   a diffusing optical element disposed between said transmissive image display device and said ocular optical system and having a diffusing surface that diffuses light passing through said transmissive image display device,
   wherein said diffusing optical element is disposed near said image formed by said transmissive image display device to enlarge a pupil by diffusing said image, and
   said diffusing surface is curved to correct curvature of field produced by said ocular optical system.

2. An image display apparatus, comprising:
   an illuminating light source;
   a transmissive image display device for displaying an image by transmitting light from said illuminating light source;
   an ocular optical system for projecting the image formed by said transmissive image display device into an observer's eyeball as an enlarged image;
   a diffusing optical element having a curved diffusing surface to cancel curvature of field produced by said ocular optical system; and
   an optical element with power which is disposed between said illuminating light source and said diffusing optical element, wherein said transmissive image display device and said diffusing optical element are moveable.

3. An image display apparatus according to claim 1, wherein said diffusing surface is provided on an exit surface of said diffusing optical element that is the closest to said ocular optical system.

4. An image display apparatus according to claim 1 or 2, wherein said illuminating light source is arranged in the form of a point source.

5. An image display apparatus according to claim 4, wherein said point source has a lamp, a concave mirror, and a stop with a point aperture, said concave mirror having such a configuration that rays of light emitted from said lamp are substantially focused onto the aperture position of said stop.

6. An image display apparatus according to claim 1, further comprising an optical element with power which is disposed between said illuminating light source and said diffusing optical element, wherein said transmissive image display device and said diffusing optical element are movable.

7. An image display apparatus according to claim 1 or 2, wherein said diffusing optical element is a diffraction grating.

8. An image display apparatus according to claim 1 or 2, wherein said illuminating light source is arranged to make a bundle of parallel rays incident on said image display device.

9. An image display apparatus according to claim 8, wherein said illuminating light source includes light producing means for producing light, and a parallel ray bundle producing optical element for converting light emitted from said light producing means into a bundle of parallel rays.

10. An image display apparatus according to claim 9, wherein said parallel ray bundle producing optical element is provided between said light producing means and said image display device.

11. An image display apparatus according to claim 9, wherein said parallel ray bundle producing optical element has a positive power as a whole.

12. An image display apparatus according to claim 11, wherein said parallel ray bundle producing optical element comprises a condenser lens having a biconvex configuration.

13. An image display apparatus according to claim 1, wherein said diffusing surface is provided on an entrance surface of said diffusing optical element that is the closest to said image display device.

14. An image display apparatus comprising:

an illuminating light source;

a transmissive image display device for displaying an image by transmitting light from said illuminating light source;

an ocular optical system for projecting the image formed by said transmissive image display device inside an observer's eyeball as an enlarged image;

a diffusing optical element disposed between said transmissive image display device and said ocular optical system and having a diffusing surface which is curved so as to correct field curvature involved in said ocular optical system; and an optical element with power which is disposed between said illuminating light source and said diffusing optical element, wherein said transmissive image display device and said diffusing optical element are moveable.

* * * * *